Nov. 8, 1949          C. P. EDWARDS          2,487,429
ANTENNA ROTATION CONTROL SYSTEM
Filed Jan. 30, 1947
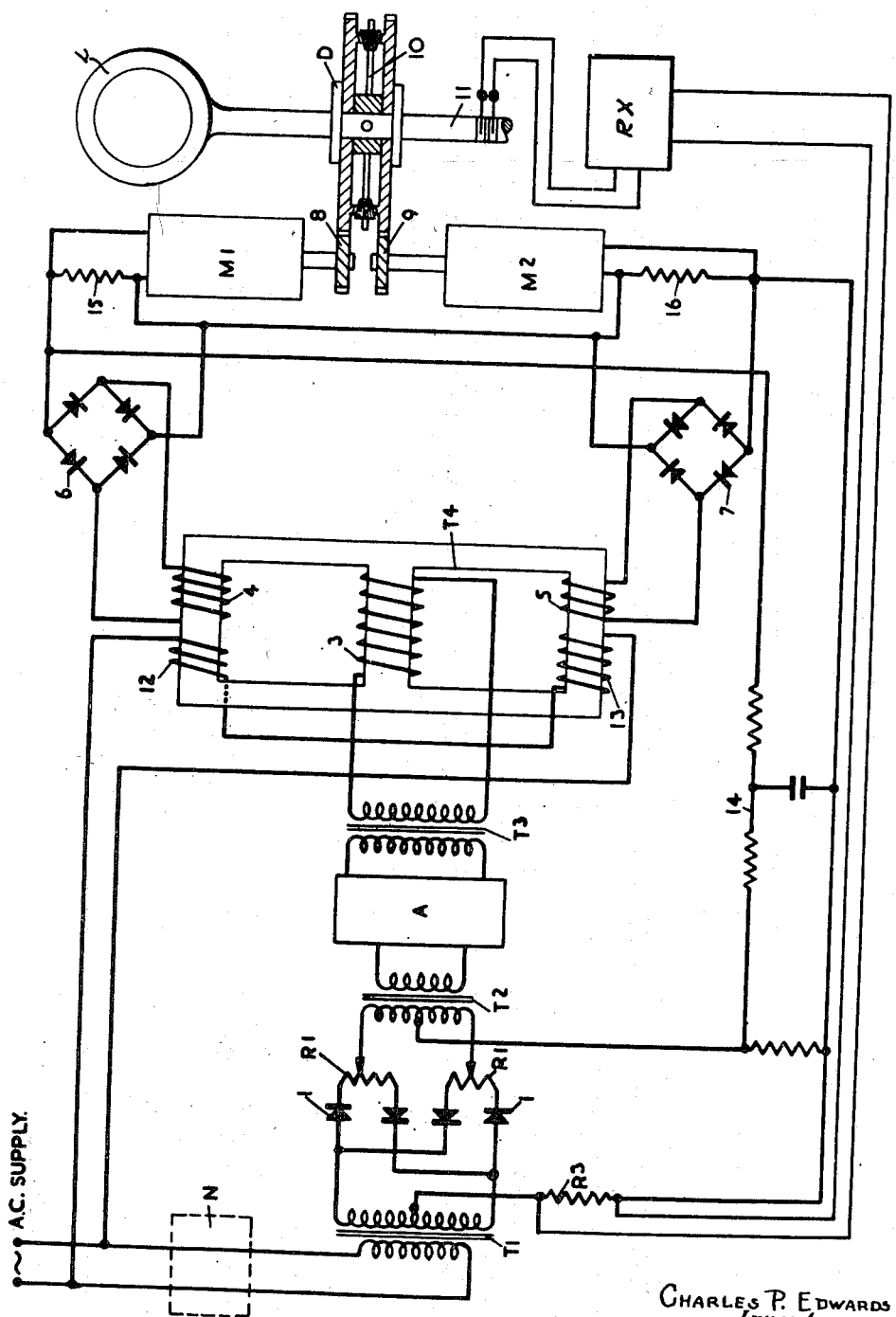
Charles P. Edwards
Inventor
By
Cushman, Darby & Cushman
Attorneys Patented Nov. 8, 1949

2,487,429

UNITED STATES PATENT OFFICE 2,487,429

ANTENNA ROTATION CONTROL SYSTEM

Charles Philip Edwards, Farnborough, England, assignor to the Minister of Supply in His Majesty's Government of Great Britain and Northern Ireland, London, England Application January 30, 1947, Serial No. 725,364
In Great Britain June 22, 1945

Section 1, Public Law 690, August 8, 1946
Patent expires June 22, 1965

6 Claims. (Cl. 343—117)

This invention relates to automatic position control means for radio and like apparatus and is more especially intended for use with adjustable aerial systems such as rotatable loop aerials or the stationary loop or vertical type with a rotating search coil usually known as a goniometer, as used in automatic radio direction finding equipment.

In automatic radio direction finders, otherwise known as radio compasses, there is normally provided, for example, a single-loop switch-cardioid type of aerial, rotatable about an axis fixed in relation to the craft in which the device is used, the position of the aerial about its rotational axis being controlled by circuits to which is fed the signal received by the aerial. The control may be arranged to move the aerial into a position in which it receives signals of minimum or zero strength and to maintain it in such position, the control being actuated either by a D. C. voltage derived from the received signal, which is reduced to minimum or zero when the loop aerial moves to the desired position of minimum or zero received signal, and reappears in reversed polarity if the loop moves past that position; or by an A. C. voltage reduced to zero or minimum, and reappearing in reversed phase, in like circumstances.

The invention aims at providing a control system which will be robust in construction, simple in operation and maintenance, rapid in operation, and capable of bringing the adjustable aerial system such as a rotatable loop aerial or like controlled object to rest in the desired position without appreciable overswing or oscillation, i. e. being substantially dead-beat.

According to the invention apparatus in which an electrical control signal is adapted to set a movable object to a given position comprises means for driving said object through a differential by electric motors driving in opposite directions to maintain zero torque on the object when the motors operate at the same speed, a normally balanced control circuit for the motors to which the control signal is applied to disturb the balance conditions and thereby cause relative motion of the motors so that the object is displaced to the required position and means whereby the balance is restored when the required position is reached.

In automatic position control apparatus for radio and like equipment according to the invention a movable object, e. g. a loop aerial, is positioned by two electric motors, adapted to apply drives to the movable object in opposite sense or direction, through common differential gearing, and means are provided whereby the relative motor speeds, (and thus the resultant drive applied to the movable object), are controlled by a control voltage applied to the motor circuits; which control voltage is a function of the position of the movable object and is preferably of small value. The control voltage as applied to the motor circuits may be D. C. or A. C., and the motors may be D. C. or A. C. driven and generally will be continuously running so that an immediate response to a control signal is achieved and accurate setting of the movable object made possible. The circuit may incorporate damping arrangements, e. g. in the form of feedback voltage from the motors, dependent in value on their relative speeds, to an earlier stage of the control circuit, in order to prevent or minimise overshoot or oscillation of the controlled object in coming to rest in the desired position.

The invention will be understood from the following description of a few forms (given, however, merely by way of example) which it may assume, and this description will be more readily followed by reference to the accompanying drawings representing the circuit diagram of one form of the invention.

In carrying the invention into effect in one convenient manner when applied to an automatic radio direction finder or radio compass, there is provide, as shown in the drawing, a control circuit comprising a rectifying bridge formed of rectifiers I, and potentiometers R1, R2, between, and connected to, the secondary winding of transformer T1 and the primary winding of transformer T2. The secondary winding of transformer T2 is connected to an amplifier A, designed for zero phase shift at the working frequency viz. the frequency of an auxiliary A. C. supply (as shown) which may be of the order of 200 c. p. s. From the output transformer T3 of the amplifier the voltage is fed to the primary 3 on the centre limb of a voltage balance transformer T4 having three limbs of equal cross-sectional area. Each of secondary windings 4, 5 on the outer limbs feeds a voltage through a rectifier bridge 6 or 7 to a small D. C. motor M1 or M2. The motors may have permanent magnets or separately excited fields and are arranged to rotate in opposite senses. They are connected through identical trains of reduction gearing 8, 9 to differential gearing D, of which the planet wheel carrier 10 is fixed to, or geared to, a shaft 11, forming or carrying the object (e. g. a loop aerial L) of which the position is to be controlled. It will be clear that as long as the motors M1, M2 run at equal speeds the shaft 11 remains stationary.

The transformer T4 is provided with polarising windings 12, 13 connected in series to the A. C. supply and so arranged that with equal loads on the output secondary windings 4, 5 no magnetic flux passes through the centre limb of the transformer T4 carrying the primary winding 3. The primary of transformer T1 is connected across the A. C. supply terminals, and a D. C. control voltage can be applied to the input terminals, S, across resistance R3 connected between the centre tappings of the primary of transformer T2 and the secondary of transformer T1.

With no D. C. voltage across the terminals S, the potentiometers R1, R2 are adjusted so that zero A. C. voltage appears across the terminals of the secondary winding of transformer T2. When a D. C. voltage is applied to terminals S a current flows through one half of the primary winding of transformer T2 during the positive half cycle of the A. C. input, and in the opposite direction through the other half of the primary winding of transformer T2 during the negative half cycle. The resultant voltage across the secondary winding of transformer T2 approximates roughly to rectangular wave-form, and clearly reverses in phase if the D. C. input voltage at terminals S is reversed in polarity. The higher harmonics of this wave-form are removed by suitable filters in the amplifier, A, which may otherwise be of known design and have a maximum output of, say, 2 to 10 watts. It will be noted that the output from the amplifier is dependent in value upon, and controlled by, the value of the voltage applied to terminals S.

Due to the arrangement of the windings of transformer T4, and the loads on the secondary windings 4, 5 being equal, the working flux in the outer limbs is approximately half maximum value when there is no input to the primary winding 3 on the centre limb i. e. with zero control voltage across terminals S, and the D. C. motors M1, M2 running at equal speeds are supplied with approximately half maximum voltage. When a voltage is applied to terminals S the circuit is thrown out of balance by an amount depending on the value of the control voltage applied so that the voltage supplied to one motor is increased and to the other is decreased, resulting in a difference of motor speeds which provides a resultant drive, through differential gearing D, on the shaft 11. Under extreme conditions of unbalance, corresponding to maximum power output from the amplifier A, the flux in one outer limb is approximately doubled in value (compared with its value when the circuit is balanced and inoperative), while that in the other limb is reduced substantially to zero, the total voltage induced in the polarising windings 12, 13 remaining constant. The motor speeds differ by an amount approximately proportional to the amplifier output; and the action is clearly reversible.

The voltage applied to terminals S in the case of an automatic radio direction finder is derived through a radio receiver RX from the signal received by the loop aerial L or goniometer on shaft 11, and clearly the circuit described above will operate to move the shaft 11 until the aerial system receives zero or minimum signal. If desired the shaft 11 may be connected or geared to a suitable indicator showing the instantaneous position of the aerial system.

In order to improve damping in the system, and thereby reduce or eliminate oscillation and/or overshoot of the shaft 11 when moved by the motors M1, M2 the circuit may be arranged so that a feed back voltage from the shaft drive is fed to the input circuit in opposition to the control voltage. The D. C. voltage fed back should be proportional to the angular velocity of the shaft 11, i. e. proportional to the difference between the rotational speeds of motors M1, M2 and since each motor terminal velocity is sensibly proportional to the motor speed, the feedback voltage may conveniently be obtained by connecting the motors in series-opposition and applying the voltage difference so obtained through a ripple-smoothing filter and portential divider, 14, to the centre tapping of the primary winding of transformer T2 as shown. Resistance loads 15, 16 across the motor terminals consuming a small fraction of the available power, are desirable and may be incorporated, where fast operation of the system is required.

If desired a phase-compensating network, N, may be included in the A. C. supply circuit to transformer T1. Further, the amplifier A may include a push-pull output stage, in which case the output transformer T3 may be omitted and the winding 3, on the centre limb of transformer T4 (which then functions as an output transformer) provided with a centre-tapping to allow the push-pull output to be fed thereto.

In a modified form of the invention adapted to respond to an A. C. control voltage, reversible in phase to determine the sense in which the shaft 11 is to be moved, the circuit may remain substantially as shown in the accompanying drawing, except for the following changes:

The transformers T1, T2 and rectifier bridge 1, R1, R2 are omitted the control voltage being fed directly to the input terminals of amplifier A. The A. C. supply is employed as a reference supply, providing polarising power through windings 12, 13 to the transformer T4. The D. C. feedback damping system, 14, is also omitted, and replaced by an A. C. velocity feedback damping system, comprising an additional secondary winding on the centre-limb of transformer T4 connected in series with the amplifier input terminals so that the voltage from this additional secondary winding is in phase opposition to the controlling input voltage. When a permanent-magnet or separately-excited D. C. motor, M1 or M2, is fed from an A. C. supply through a rectifier, 6 or 7, the voltage at the rectifier input terminals contains a component proportional to the back C. M. F. i. e. proportional to the motor speed. The additional secondary winding on the centre limb of transformer T4 aforementioned thus supplies a voltage containing a component which is proportional to the difference between the speeds of motors M1, M2, i. e. proportional to the rotational speed of shaft 11, and is effective to prevent overswing and hunting.

It should be understood that the invention is not limited to details of the circuits described above. Thus, the single five-winding transformer T4 may be replaced, if desired, by two separate three-winding transformers each feeding one of the motor circuits and performing the same functions as T4. Further A. C. motors, e. g. series-connected A. C. commutator motors, may be used in place of the D. C. motors with associated rectifiers which are illustrated, and in this case permanent mechanical loads, preferably in the form of eddy-current brakes, should be provided on the motor shafts. In any of the circuits referred to there may be provided a differential resistance in common to the two motor circuits, allowing adjustment of balance to ensure equal motor running speeds under null conditions.

Although described as applied to control rotational movements the invention is not limited to such applications, since clearly small modifications can readily be introduced whereby it can be used to control other modes of displacement e. g. linear movement.

I claim:

1. An apparatus for controlling the movement of an antenna in accordance with the received signals comprising a means for producing a direct current voltage that varies with the movement of the antenna and is at a minimum when the antenna is at a desired position, a transformer, rectifier circuits connected to the output of said transformer, a balance transformer connected to the output of said rectifier circuits, a first drive motor, means for connecting said first drive motor to one side of said balance transformer, a second drive motor, means for connecting said second drive motor to the opposite side of said balance transformer, means for applying the direct current voltage to said primary transformer, and a differential gear mechanism, the motors being arranged to drive the gear mechanism such that the mechanical output of the gear is related in sense and magnitude to any difference in speed of the motors.

2. An electric motor control system for a differential gear mechanism comprising two electric motors arranged to drive the gear mechanism such that the mechanical output of the gear is related in sense and magnitude to any difference in speed of the motors, a normally balanced control circuit for said motors including a three limbed balancing transformer, a secondary winding on each outer limb of said transformer for supplying energy to the respective motors, a control circuit connected to a winding on the center limb of said transformer and a polarizing circuit connected to windings on each outer limb of said transformer, the arrangement being such that an alternating control voltage of variable amplitude and reversible phase and of the same frequency as alternating voltage applied to the polarizing circuit, when applied to the control circuit disturbs the balance of said control circuit and causes the speed of the motors to change differentially.

3. An electric motor control system for a differential gear mechanism comprising two electric motors arranged to drive said gear mechanism such that the mechanical output is related in sense and magnitude to any difference in speed of the motors, a three limb transformer, a secondary winding on each outer limb of said transformer for supplying energy to the respective motors, a polarizing winding on each outer limb of said transformer to which an alternating polarising voltage is applied and a primary winding on the center limb of said transformer to which an alternating control voltage of varying amplitude and either of the same or of opposite phase of the polarizing voltage is applied so as to derive an output from the differential gear corresponding to the amplitude and phase sense of the control voltage.

4. An electric motor control system for a differential gear mechanism comprising two electric motors arranged to drive said gear mechanism such that the mechanical output is related in sense and magnitude to any difference in speed of the motors, a transformer in each motor conduit, primary, secondary and polarizing windings on each transformer and common input circuits to said primary and polarizing windings whereby by applying an alternating control voltage of varying amplitude and either of the same or of opposite phase to the polarizing voltage to the common primary input circuit an output is obtained from the differential gear mechanism corresponding to the amplitude and phase sense of the control voltage.

5. An electric motor control system for a differential gear mechanism comprising two separately excited direct current motors connected in series opposition and arranged to drive said gear mechanism such that the mechanical output is related in sense and magnitude to any difference in speed of the motors, a three limbed transformer, a secondary winding on each outer limb of said transformer, a rectifying device connected to each secondary winding for supplying direct current to the armature of a respective motor, a polarizing winding on each outer limb of said transformer to which an alternating polarizing voltage is applied, a primary winding on the center limb of said transformer, circuit means for converting a direct current signal of varying amplitude and sense into an alternating current of correspondingly varying amplitude and phase for application to said primary winding so as to obtain an output from the differential gear corresponding to the amplitude and sense of the direct current signal.

6. An electric motor control system as claimed in claim 5 comprising a direct current negative feed back circuit from across the circuit of the series connected motors to the direct current signal circuit in order to improve the damping of the system.

CHARLES PHILIP EDWARDS.

REFERENCES CITED

The following references are of record in the file of this patent:

UNITED STATES PATENTS

| Number | Name | Date |
|---|---|---|
| 1,669,107 | Umansky | May 8, 1928 |
| 1,703,317 | Minorsky | Feb. 26, 1929 |
| 1,975,023 | Sertillange | Sept. 25, 1934 |
| 2,257,757 | Moseley | Oct. 7, 1941 |
| 2,361,956 | Moseley | Nov. 7, 1944 |
| 2,422,180 | Broadbent | June 17, 1947 |

FOREIGN PATENTS

| Number | Country | Date |
|---|---|---|
| 832,512 | France | July 4, 1938 |